United States Patent
Gupta et al.

(10) Patent No.: US 11,188,201 B2
(45) Date of Patent: Nov. 30, 2021

(54) SYSTEM AND METHOD FOR CUSTOMIZING INFORMATION FOR DISPLAY TO MULTIPLE USERS VIA MULTIPLE DISPLAYS

(71) Applicant: Commercial Streaming Solutions Inc., Las Vegas, NV (US)

(72) Inventors: Sameer Mohan Gupta, Los Angeles, CA (US); Seth Schorr, Las Vegas, NV (US)

(73) Assignee: Commercial Streaming Solutions Inc., Las Vegas, NV (US)

( * ) Notice: Subject to any disclaimer, the term of this patent is extended or adjusted under 35 U.S.C. 154(b) by 31 days.

(21) Appl. No.: 16/665,308

(22) Filed: Oct. 28, 2019

(65) Prior Publication Data

US 2020/0133452 A1   Apr. 30, 2020

Related U.S. Application Data

(60) Provisional application No. 62/751,943, filed on Oct. 29, 2018.

(51) Int. Cl.
*G06F 3/0484* (2013.01)
*G06Q 50/34* (2012.01)
(Continued)

(52) U.S. Cl.
CPC .......... *G06F 3/0484* (2013.01); *G06F 3/1423* (2013.01); *G06N 5/04* (2013.01); *G06N 20/00* (2019.01); *G06Q 50/34* (2013.01)

(58) Field of Classification Search
CPC ..... G06F 3/0484; G06F 3/1423; G06N 20/00; G06N 5/04; G06Q 50/34
(Continued)

(56) References Cited

U.S. PATENT DOCUMENTS 8,146,077 B2   3/2012 McNally et al.
9,026,479 B1*  5/2015 Baluja ................. G06F 16/2457
                                                706/12
(Continued)

FOREIGN PATENT DOCUMENTS

WO   2014/052259   4/2014
WO   2016/141016   9/2016

OTHER PUBLICATIONS

Schmitz, A., Li, M., Schonefeld, V., and Kobbelt, L. Ad-Hoc Multi-Displays for Mobile Interactive Applications. The Eurographics Association (2010), 45-52. (Year: 2010).*

(Continued)

*Primary Examiner* — Stephen S Hong
*Assistant Examiner* — Broderick C Anderson
(74) *Attorney, Agent, or Firm* — Weide & Miller, Ltd.

(57) ABSTRACT

A method and system are configured to generate user-specific information, such as wager-related information, for display on one or more display devices of a user. The system is configured to store user preferences, to determine a location of the user and a configuration of the user's display device(s), and to use the location information and at least one of the user preference information and group information to generate the user-specific information, and to configure the user-specific information based upon the configuration of the user display device(s), wherein when there is more than one user display device, the user-information and configuration thereof may vary for each device.

17 Claims, 4 Drawing Sheets

(51) Int. Cl.
  *G06F 3/14*    (2006.01)
  *G06N 5/04*    (2006.01)
  *G06N 20/00*   (2019.01)
(58) Field of Classification Search
  USPC .......................................................... 715/745
  See application file for complete search history.

(56)          References Cited

U.S. PATENT DOCUMENTS

2002/0049975 A1*   4/2002   Thomas ................ G06Q 50/34
                                                  725/60
2013/0296028 A1*  11/2013   Baerlocher ............ G07F 17/34
                                                  463/25
2016/0125691 A1*   5/2016   Rangarajan ......... G07F 17/3225
                                                  463/25
2017/0024951 A1    1/2017   Nelson et al.
2018/0330248 A1*  11/2018   Burhanuddin ......... G06N 20/00
2018/0336645 A1*  11/2018   Price .................. G06Q 30/0631
2019/0317970 A1*  10/2019   Chung ................. G06F 16/957

OTHER PUBLICATIONS

Search Report and Written Opinion for PCT Application No. PCT/US2019/058329, dated Mar. 18, 2020, 16 pages.

* cited by examiner

SYSTEM AND METHOD FOR CUSTOMIZING INFORMATION FOR DISPLAY TO MULTIPLE USERS VIA MULTIPLE DISPLAYS

RELATED APPLICATION DATA

The present application claims priority to U.S. Provisional Application Ser. No. 62/751,943, filed Oct. 29, 2018.

FIELD OF THE INVENTION

The present invention relates to system and methods for generating and displaying information such as sports wagering information to a plurality of users viewing content on multiple user displays.

BACKGROUND OF THE INVENTION

Currently casinos sports books, sports betting parlors, sports betting websites and sports betting information aggregation websites merely display or provide sports-event wagering information generically to all bettors, such as by merely sorting the information by sport, league, game and time. When walking into a sports book at a casino in Las Vegas, for example, there is an overwhelming amount of information displayed on overhead displays. For example, the information might comprise a display of all upcoming NFL games with betting lines, another display of upcoming NBA games with betting lines, and the like. There are also physical printed forms which include a laundry-list of betting options, such as parlay wagering options and the like. This quantity of information is growing with the introduction of proposition or "prop" bets (proposition bets on the outcome of individual sub-results of one or more sports events, such as the results of a particular athlete in an event or in-game action) and live (or in-play) betting.

The information can be overwhelming. A bettor may have difficulty locating information regarding particular events, teams, players or the like, and/or potential bets which they can make relative to those events, teams or players.

A new method of providing bettors with information relating to sports wagering is desired.

SUMMARY OF THE INVENTION

Embodiments of the invention comprise methods and systems which are configured to generate information for display on multiple display devices of the user. In one embodiment, the generated information is user-specific.

In one embodiment, the information comprises sports wagering related information which is displayed to a bettor. In one embodiment, the method and system are configured to generate user-specific information from a larger set of information, such as based upon one or more user preferences.

The information, such as user-specific information, is arranged or formatted for display on the multiple display devices, such as by determining the amount of information and format for the information to be displayed on each of the devices, such as based upon the number and configuration (including display size) of the devices.

In one embodiment of the invention, an information server stores user accounts each having a user's preferences associated therewith. The information server utilizes a user's preferences to generate a set of user-specific information, such as by using the preferences as a filter on a larger set of information. The information server utilizes information regarding a plurality of user displays to configure or format the user-specific information for display on the devices, such as by selecting the particular user-specific information to display on each of the devices and the format of that information.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods and systems which are configured customize information for display to different users, including users viewing the information or content via different display devices. In one embodiment, the generated information is user-specific. The information may comprise, for example, sports wagering related information which is displayed to a bettor. In one embodiment, the method and system are configured to generate user-specific information from a larger set of information, such as based upon one or more user preferences or other criteria. The information is also generated based upon the display device which will display the information, such as by determining the amount of information and format for the information to be displayed on each of the devices, such as based upon the number and configuration (including display size) of the devices.

Figure 1:
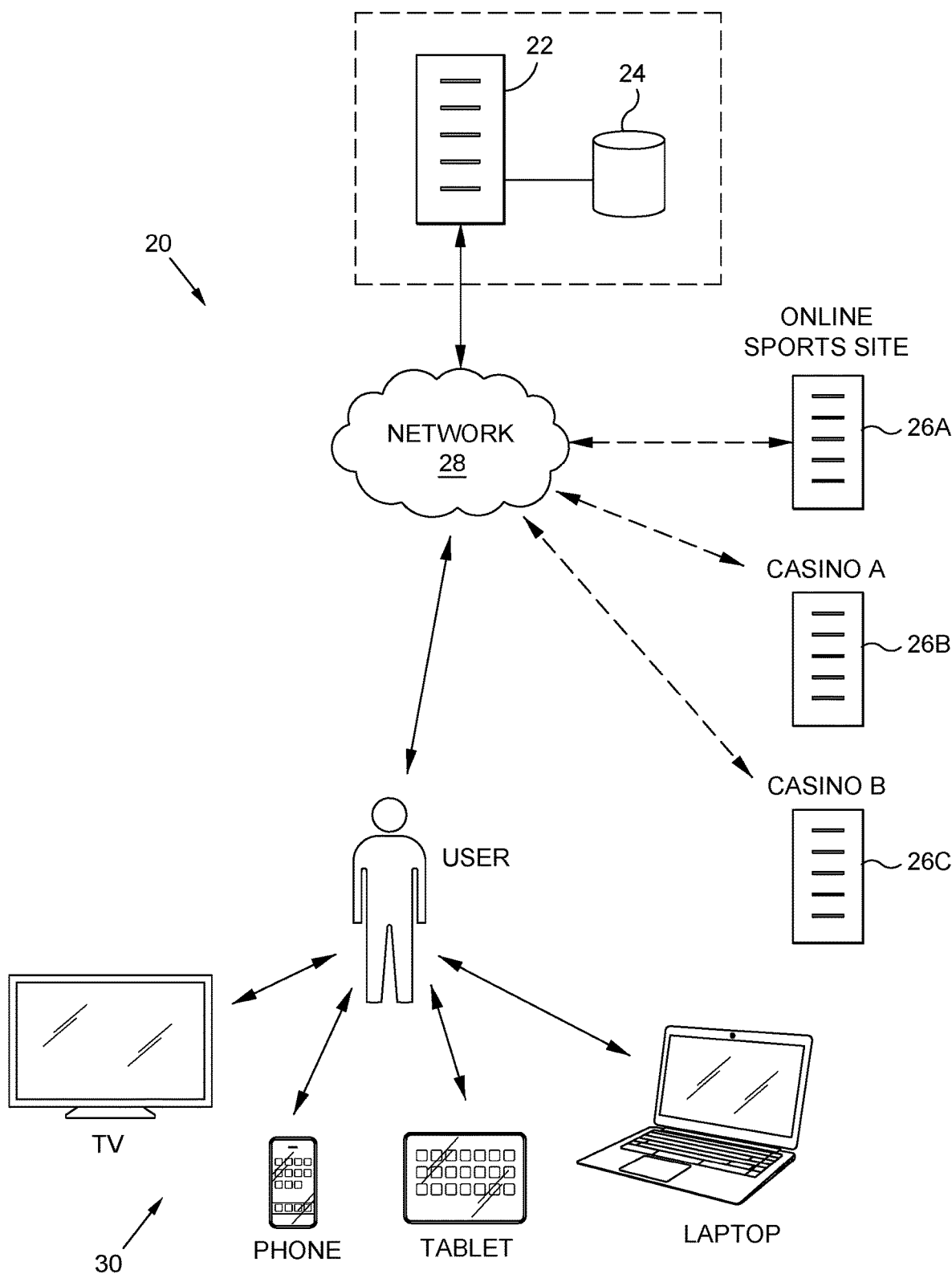
FIG. 1 illustrates one embodiment of a system of the present invention.

One embodiment of a system 20 of the invention is illustrated in FIG. 1. The system 20 comprises at least one information server 22. In one embodiment, the information server 22 is configured to generate and deliver sports wagering information, and as such may be referred to as a sports wagering information server 22. As described below, however, the server 22 might be configured to generate other or additional information.

The information server 22 may comprise one or more processors or controllers, at least one communication device or interface, a database or other data storage device, and one or more additional memory or data storage devices (such as separate from the database). In one or more embodiments, the processor(s) is configured to execute one or more instructions, such as in the form of machine readable code (i.e. "software"), to allow the information server 22 to perform various functionality, such as the functionality described herein. The software is preferably non-transitory, such as by being fixed in a tangible medium. For example, the software may be stored in the one or more memory devices. One or more of the memory devices may be read-only. In addition, the software may be stored on a removable medium in some embodiments. In general, the one or more memory devices are used as temporary storage. For example, the one or more memory devices may be random access memory or cache memory used to temporarily store some user information and/or instructions for execution by the at least one processor.

The software may comprise one or more modules or blocks of machine readable code. Each module may be configured to implement particular functionality when executed by the one or more processors, and the various modules may work together to provide overall integrated functionality. Of course, in certain embodiments, it is also possible for various of the functionality to be implemented as hardware, i.e. a processor or chip which is particularly designed to implement various of the functionality described herein.

In one embodiment, the information server 22 may include (or be linked communicatively at one or more times to) one or more input and/or output devices, such as a keyboard, mouse, touchscreen, video display or the like, whereby the processor may receive information from an operator or servicer of the information server 22 and/or output information thereto. This allows, for example, an operator of the information server 22 to interface with the information server 22 to upgrade, maintain, monitor, etc., it. In other embodiments, an operator might interface with the information server 22 via a separate workstation or other device.

In one embodiment, the processor and other elements of the information server 22 may be linked and thus communicate over one or more communication buses. In this manner, for example, the processor may read/receive software from the memory for execution, receive inputs and provide outputs to the various I/O devices, receive information from or output information to external devices via the communication interface, etc. The one or more communication devices or interfaces permit the information server 22 to communicate with external devices, networks, systems and the like. The information server 22 may communicate with those external devices or systems via one or more networks 28. The network(s) 28 might comprise wired and/or wireless communication networks, may comprise LANs, WANs or be of other types. In one embodiment, the network 28 may comprise or at least include the Internet.

The information server 22 may be configured to implement a variety of functionality (and/or there may be a plurality of different servers which each implement different functionality). In one embodiment, the information server 22 is configured to generate bettor accounts, as described in more detail below, and store bettor accounts and associated information. The associated information may comprise bettor preferences or information priorities as described below. In one embodiment, the bettor accounts may be stored in a database 24 (such as associated with one or more data storage devices) which the information server 22 can access.

In one embodiment, the information server 22 may communicate with one or more external devices or systems. For example, the information server 22 may communicate with one or more external servers 26. Such a server 26 might comprise a web server which is configured to provide sports event information such as team and/or player statistics or the like. As described below, the information server 22 may utilize such information to present bettor-customized information to a bettor. As one example, the information server 22 might communicate with a Casino A server 26B that provides current betting options and betting lines/odds, etc., as offered by Casino A (such as via a sportsbook thereof). The information server 22 might communicate with a Casino B server 26C that provides current betting options and betting lines/odds, etc. as offered by Casino B. The information server might communicate with another server 26A of an online sports site, such as an online betting site, an online sports statistics site or the like.

The information server 22 is preferably configured to communicate with one or more users (or, in relation to users who are involved in sports wagering, bettors). In particular, the information server 22 is configured to communication with (such as by providing information to) a plurality of a bettor's electronic display devices 30 such as, but not limited to, a PDA, phone, laptop or desktop computer, television or other display (such as an AR/VR device) or the like (and in the context of commercial user or venues, commercial venue displays). Preferably, the bettor devices comprise at least one electronic video display. Of course, such display devices 30 are well known and may comprise additional elements, such as a controller or processor, a communication interface, a memory device (such as for storing machine readable code or "software" for execution by the processor, such as in the form of a downloaded software application), and an input/output interface (such as for receiving input from a touchscreen, one or more buttons or the device or the like).

Preferably, the bettor display devices 30 are configured to receive information for display and cause the information to be displayed. The devices 30 generally include a video controller or other processor for processing the information for display. The information may be provided to the video or other controller via a communication interface, such as a wired communication link (such as USB, DVI, HDMI, etc.) or a wireless link (WiFi, Bluetooth, etc.). It is noted that each of the bettor's display devices 30 may have a different configuration, including a different display resolution and display size. It will be appreciated that information might be displayed to a user or bettor via a single display device or multiple display devices. As indicated below, the information which is generated and displayed to the user or better may depend upon a variety of criteria, including the configuration of the display device(s), wherein the amount or type of information and the configuration of the information which is generated for display by a display device may depend upon the configuration of the display device and wherein the information which is displayed to a user may be different when presented to the user via different display devices.

The information server 22 might comprise a casino server, such as operated by a casino company. In such a configuration, the information server 22 may be part of a casino system (such as including wager-based gaming machines, gaming tables at which wagering games are presented, etc.). However, the information server 22 might be operated by an outside vendor as well.

Figure 2:
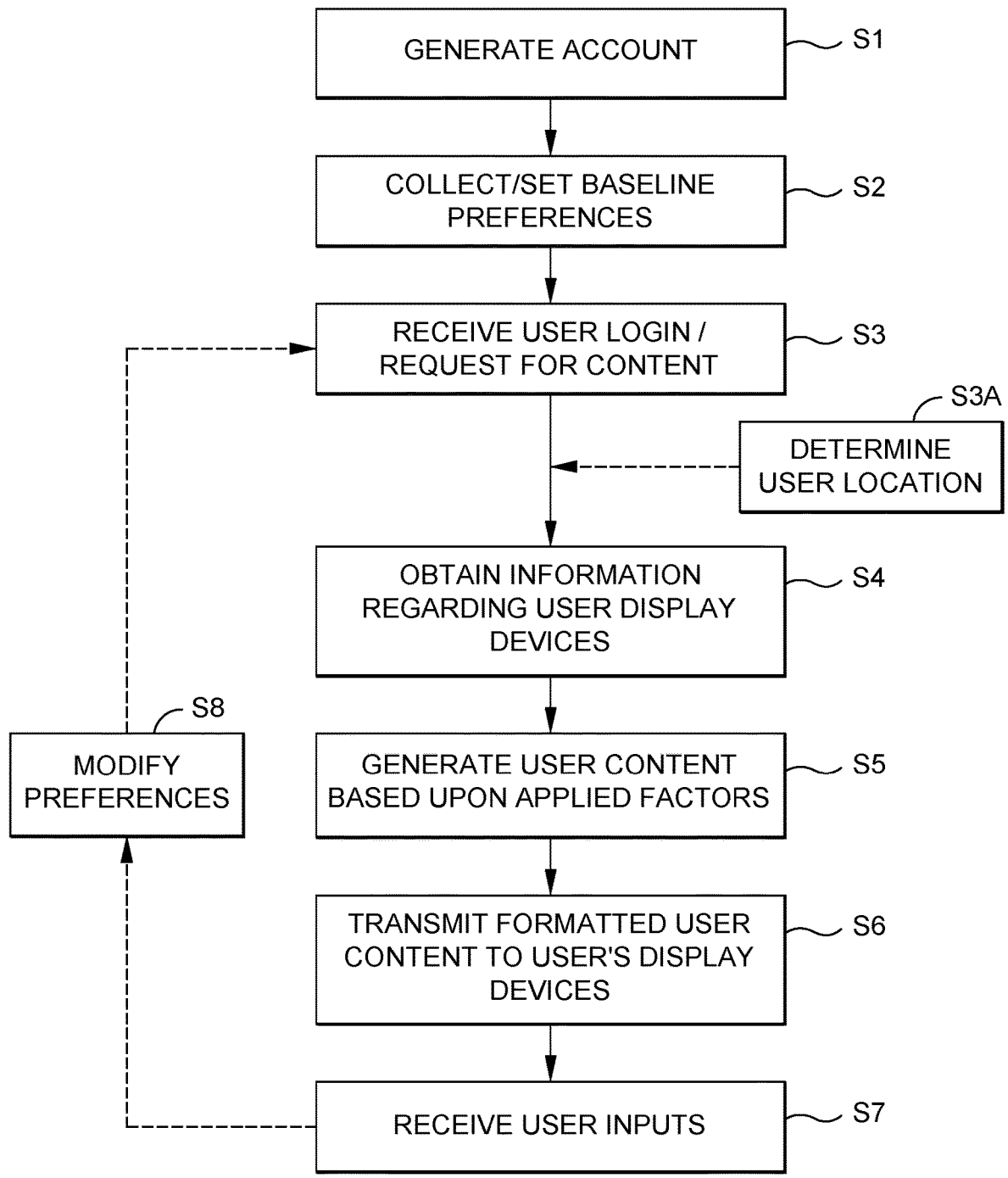
FIG. 2 is a flow chart which illustrates one embodiment of a process of the invention.

Additional aspects of the invention will be described with reference to FIG. 2, which is a flow diagram of one embodiment of a method or process in accordance with the invention. In a step S1, a bettor preferably establishes an account. The account might comprise a dedicated bettor account or, such as in the case of a casino, may be a player tracking account which is modified to include the features herein. Casino player tracking accounts are known and generally comprise accounts which identify a player. Information is linked to the player's player tracking account, such as information regarding casino game play by the player (amounts wagered at gaming machines and/or tables, amounts lost, rewards points earned and/or used, etc.) and personal information of the player, such as information regarding the player (such as one or more of name, address, phone number, email address, etc.).

In one embodiment, the bettor might fill out an online form (such as a web-based form supported by the information server 22 via an accessed webpage) or a printed form. As indicated, the bettor might have already created a player tracking account with a casino and the account of the invention might be created from or using that account. In the case of a sports betting entity, the account might be created from or using an existing betting account for that bettor.

The account is preferably linked to the bettor. The account might be identified by a unique identifier or ID. In one embodiment, that ID might be associated with a card or the like which is issued to the bettor. The account might also include security features, such as a password or the like which must be used with the ID in order to access the account. The account may store or be linked to bettor information, such as personal information which identifies the bettor.

In one embodiment, in a step S2, one or more baseline bettor preferences are set or collected. The preferences preferably relate to sports wagering information. The preferences may, as indicated, be set to a preconfigured baseline or set of preferences. In a preferred embodiment, however, the baseline preferences are set by the bettor. For example, the bettor might provide preference information via a printed form (where the information is then scanned from the form or manually entered), to a web-based form, application or the like.

The preference information may comprise a variety of information. In one embodiment, the preference information relates to sports wagering. For example, such information might comprise one or more of: (1) favorite sport team(s) in one or more sports; (2) favorite player(s) in one or more sports; (3) favorite sport(s); (4) geographic area(s); (5) favorite sports league(s); (6) size of wager(s); (7) types of wager(s) (single game, parlay, proposition, etc.); (8) event time(s)/time zones, and/or other information.

In a step S3, a bettor may login to their account and/or otherwise request content. As one example, the bettor might access a sports information webpage which is supported by server 22 or might access an application ("App") on their mobile communication device. At that time, the bettor may provide user information, such as their user ID and password (which may be stored or manually input by the bettor) or might otherwise identify themselves.

In an optional step S3A, the location of the bettor may be obtained or determined. This information may, as described below, be used in various manners or for various purposes. The bettor's location may be determined in ways which are currently known or developed in the future. For example, when the bettor is using a computing device such as a laptop or workstation, the IP address of the computing device may be utilized to determine the bettor's location. When the bettor is using a mobile device, the bettor's location may be determined in various manners, such as by signal triangulation, by GPS information, or by other means. The location information might be provided or information regarding the user's location might be obtained and then the location might be determined from that information (such as by the server 22 of the system).

In a step S4, information is obtained regarding the user or bettor's display devices 30. In one embodiment, this information might be collected as part of the account set-up process and might then be stored in the bettor's account. In another embodiment, it might be collected in real time, such as based upon the one or more displays which are being used by the bettor. For example, a bettor might login to their account using their telephone and also using a browser (or via a downloaded App) on their television. The information server 22 may poll those devices for configuration information, such as either basic information about the device (make/model) or specific information (XYZ brand TV; 42 inch 16:9 display).

Preferably, the information either directly indicates, or can be used to determine, a configuration of the displays of the display devices 30. Preferably this comprises at least a size of the display but may also include display resolution or the like.

Set forth below in Table 1 is one example of a method of determining the characteristics of a display of the user or bettor's display device(s) 30.

TABLE 1

| | |
|---|---|
| S1 | Determine whether the screen is in portrait or layout mode by receiving feedback from the software on the display device. |
| S2 | Determine size of the screen by receiving input from the software on the display device, including but not limited to the operating system |
| S3 | Match the information from the software on the display device with commonly used screen sizes |
| S4 | If the display device is a TV screen, then match the display device with a database of TV sizes as collected from the venues for further detail |

Example 1: Information is to be displayed on a TV at PKWY Tavern. The display device is determined to be a Fire TV-enabled TV screen, so it is known that the TV will be in landscape mode. Furthermore, there will be specific information about the screen size in the database of TV sizes, such as collected from the locations at which the TV is located (e.g. PKWY Tavern KonekTV #1 is 55").

Example 2: If the display device is an iPhone, then the feedback from the OS and software will allow for determination of the size of the iPhone screen, e.g., bettor is using an iPhone XS MAX with 6.5" screen.

In a step S4, the information server 22 preferably generates user content or information. The content is preferably custom-generated based upon applied factors or criteria. These factors may comprise, but are not limited to, one or more of at least: 1) the bettor's preferences or information; 2) location information; 3) group data; 4) external factors and 5) the configuration and/or number of the display device(s) which are used to display the information to the user(s).

In one embodiment, one factor may comprise a bettor's preferences or personal information. As indicated above, initially the bettor's preferences may comprise a set of baseline preferences. As detailed below, those preferences may later be modified over time. These factors or preferences may comprise, but are not limited to, one or more of: 1) a bettor's designated preferences such as designated teams, individuals or the like, or bets by odds, lines or wager amounts; and 2) the bettor's past behavior, such as teams, individuals or the like that the bettor has researched or placed bets upon; and 3) demographic or other information regarding the bettor (male/female; age; income; etc.).

In one embodiment, one factor may comprise the bettor's location. In one embodiment, the content or information may be customized based upon a detected or determined user/bettor location. For example, bets that relate to teams or events which are geographically closest to the bettor's location might be prioritized the highest, or bets that relate to teams in the same division or are ranked closest to the bettor's location or a team in the bettor's location, may be prioritized the highest. As one example, location information may indicate that a bettor is located in Kansas City, Mo. Based upon this information, bets and/or other content (team and player statistics, etc.) relating to the Kansas City Chiefs may be prioritized, as may be information relating to other teams in the same NFL Division (e.g. San Diego, Denver, and Oakland).

In one embodiment, another factor may comprise group information. For example, such factors may comprise related bettor activity, wherein activities of other bettors are used to predict the information that the bettor may be interested in. For example, when a bettor is in a designated location (such as in a particular area or venue), bets of other bettors in that same area or venue may be used as a factor in determining the content to be displayed to the bettor. As one example, a bettor may be in a bar in Las Vegas, Nev. The system may determine that a high percentage of other bettors in that location are betting on an NHL game between Montreal and St. Louis. The system may thus determine that information should be displayed about bets on that game (and, for example, secondary information regarding bets on the Las Vegas Golden Knights NHL team/game, given that the bettor is in Las Vegas). Of course, information regarding other bettors may be used in various manners to identify content to present to the bettor.

In yet another embodiment, another factor may comprise external factors. Such factors may comprise but are not limited to one or more of: 1) time (time of day, day, month, season, year); 2) weather; and 3) marketing or advertising (such as bets which are promoted).

Lastly, the configuration (including size and/or layout) of the display device(s) which is going to display the information may be utilized to determine the information which is to be displayed (and/or, as detailed herein, the configuration of the selected information/content).

Such preferences or factors may be utilized to not only determine which information is displayed, but how the information is displayed and the order of the information which is displayed. For example, bettor-specific information may first be generated or determined based upon the factors identified herein and then that information may be ordered, such as based upon time sensitivity (e.g., the first betting line which is listed may be relative to a wagering event which has the earliest cut-off/start time, as compared to later events).

In one embodiment, the information server 22 preferably specifically obtains information based upon one or more of the factors or filters information based upon those factors (e.g. filters a large set of information for one or more sub-sets of that information). For example, the bettor's preferences may indicate that their favorite team is the Kansas City Chiefs of the NFL, their favorite player is Tyreek Hill, and that the bettor prefers single game bets and prop bets. Based upon these preferences, the information server 22 may contact one or more external servers 26 for information relating to potential wagers on the Kansas City Chiefs (such as wagers which are available from external sports betting sites, casinos or the like), and/or statistical information regarding the Kansas City Chiefs. In another embodiment, the information server 22 may automatically obtain, update and store a large amount of sports wagering related information and then filter that information based upon the bettor's preferences (e.g. the information server 22 maintains a database of sports wagering related information, such as statistics regarding all NFL teams and then filters that information in this example just for information relating to the Kansas City Chiefs).

It is noted that the "user content" or information may comprise various content. Preferably, the content comprises information which relates to one or more bets or comprises bet opportunities or options. Most preferably, the content relates to sports-type betting. As one example, the content proposition bets or any other type of betting option), including information regarding the event or action (such as the proposition event, the individuals, teams, etc.), the lines or odds, etc. The content might also comprise information relating to a bet option, such as information relating to the individuals, teams or the like. For example, the content may, as described above, comprise statistic information regarding players or teams involved in the event that the bet is based upon. The content might comprise other information, however, such as an injury report, weather report or the like.

As noted above, the information server 22 preferably utilizes information regarding the one or more display devices that are to be used to display the information to the bettor in order to generate and/or format the bettor information. This step may comprise one or more of the following: a) determining the amount of bettor information to be displayed; b) determining the format that the information should be displayed in; and c) determining an allocation of the information between multiple display devices when multiple display devices are available.

The display or "screen" sizes (or sizes, when more than one display is used) is used to select the optimal information to be displayed. This is done by matching the available content options with all available screens sizes and optimizing the content based on a weighted-value of the possible content that should be shown on the screens at any specific time.

Figure 3:
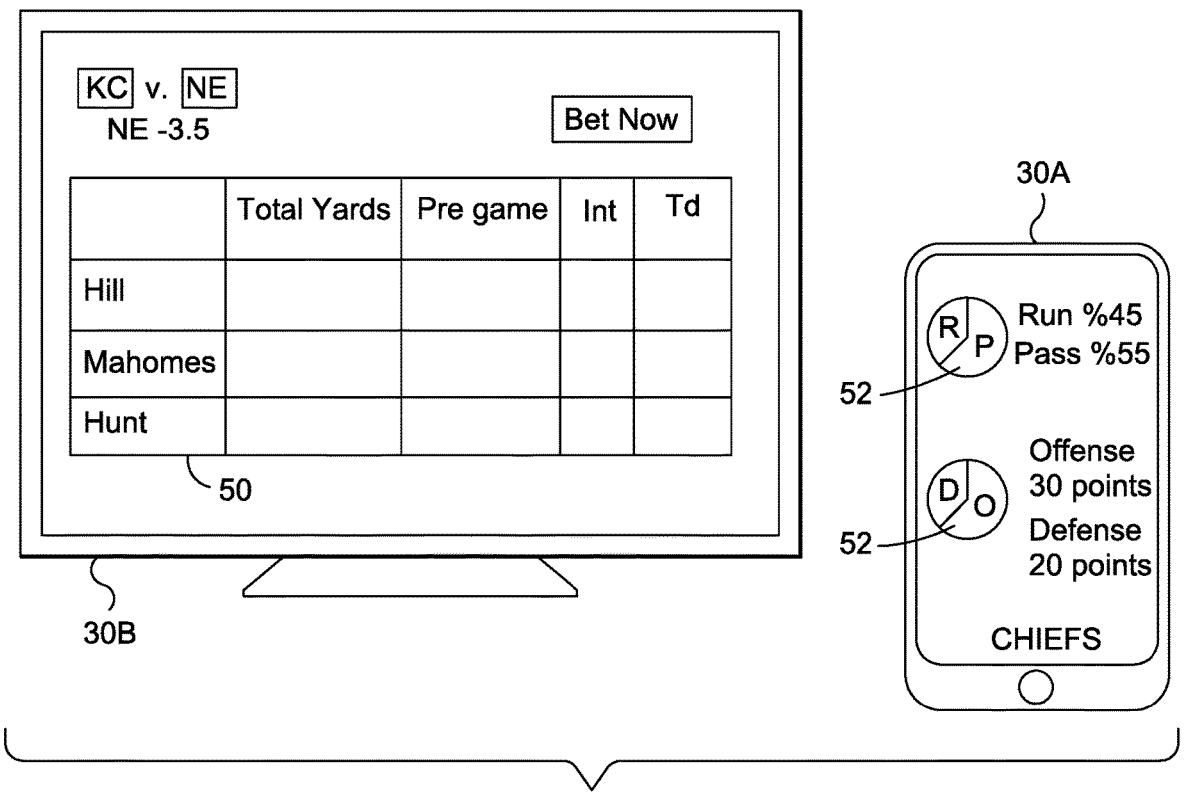
FIGS. 3 and 4 illustrate first examples of displays of information in accordance with the invention.

As one example, referring to FIG. 3, a bettor might seek to have information displayed on both their mobile phone 30A and their in-home television 30B. The server 22 may determine that the screen size of the mobile phone 30A is 2.5 inches wide by 6 inches long, and that the TV is a wide screen with a diagonal size of 55 inches. Using this information, the server 22 may first determine the primary content to be displayed, such as based upon the bettor's preferences, location or the like. For example, the server 22 might use these factors to determine that information and bets regarding the Kansas City Chiefs should be presented. Next, the server 22 may determine that the wide screen TV would be best to display a table 50 of information, such as information regarding individual players for the Chiefs and their game statistics, plus related information regarding betting on the next upcoming Kansas City Chiefs game. At the same time, the server 22 may determine that the small size of the mobile phone 30A makes it most suited to displaying simple visual information, such as pie chart 52 which indicate (in this example), the percentage of offense by run and pass and the average points per game by the offense and against the defense.

Figure 4:
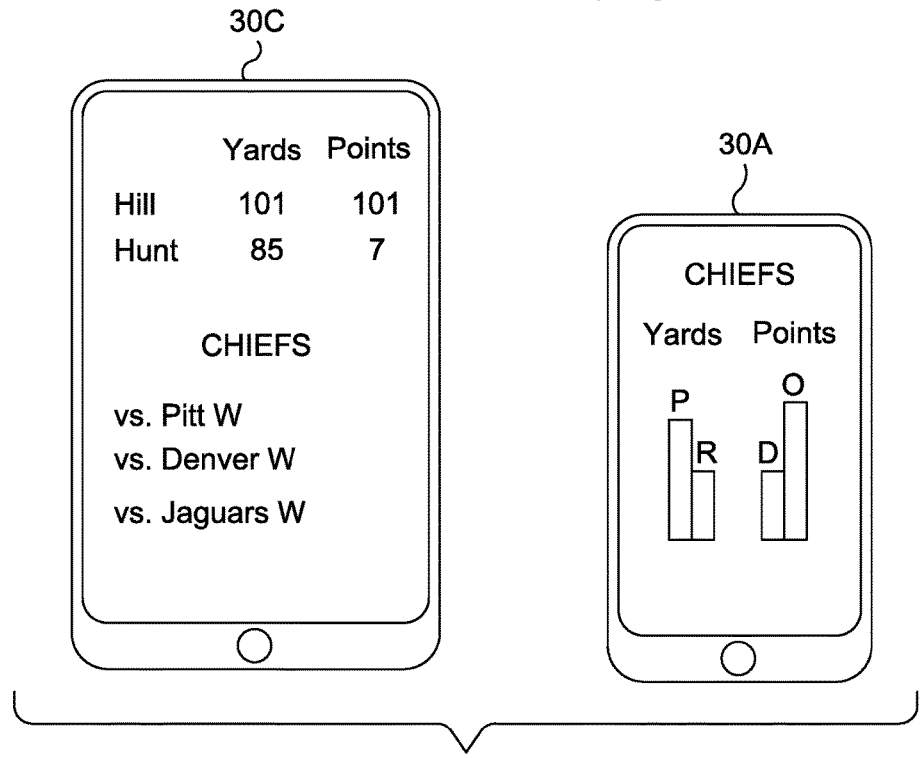

As another example, as illustrated in FIG. 4, a bettor might seek to have information displayed on their mobile phone 30A and their tablet 30C. In this configuration, the information server 22 might configure team statistical information for display in bar graph format on the phone 30A. Because a table of information might not be readable if presented on the tablet 30C (as compared to the television as in FIG. 3), the information server 22 might select and configure basic textual information for display on the tablet 30C.

Of course, the amount of information, how it is displayed and the like may vary based upon the initial set of generated bettor information and the particular display device(s) 30. In various embodiments, information may be displayed graphically, as text, in a table or other format, and may be displayed using the entire display or just a portion of the display, such as in a sub-window or pop-up window (for example, relative to a television of the bettor, the television may display a main display of a particular sports event from a feed such as the Internet, cable, satellite or over-the-air feeds, and secondary sports wagering related information of the invention might be displayed in a pop-up window, in a chryon or the like, relative to the main content). Of course, the displayed information may change over time. For example, the displayed information might comprise the betting line on a particular game. That betting line might change over time, such as based upon a player injury report, incoming bets or the like. When the betting line changes, that information may be updated to the bettor. Visual or audio indicators (lights/sounds or other alarms, triggered at one or more of the bettor's devices) may be generated to alert the bettor to changes in information, including particularly important information, winning bet outcomes or a variety of other information/events.

In one embodiment, the information is obtained or generated using an algorithm (such as implemented by software executed by the processor of the server 22). This algorithm may implement the factors or criteria noted above to obtain or generate the information, as well as format it. In one embodiment, the system includes or links to an artificial intelligence (AI) engine (which may be implemented by software running on the server 22, including as part of the algorithm, or as an external engine which the server 22 can access). The AI engine or component may favor or weight more heavily the generation and/or display of information which is determined to most likely result in the highest probability of the user placing a wager (where the AI engine/component may evaluate various of the factors in relation to the information in order to reach a conclusion as to what information is likely to meet this goal). For example, if the user has not made many bets before, but location information indicates that they are in a sports bar where a lot of in-game betting on the San Francisco 49ers is occurring, then in-game bets on the San Francisco 49ers may be prioritized. Once the user starts making a significant number of bets, their personal betting behavior may also be evaluated by the algorithm. For example, if that same user starts to place in-game bets on the Golden State Warriors, then in-game bets on the Golden State Warriors will be weighted higher.

For example, relative to the presentation of available bets, the algorithm may weigh all possible bets against the data profile of the user and their location, and then shows a series of bets sorted based on the weight of each bet. This process is preferably time-sequenced, as bet weights will change as games' start times approach, begin and progress to completion.

In one preferred algorithm, bet or wager information may be presented to a bettor based upon the following criteria:

First, prior bets won by bettor by winning subject, such as winning team (e.g., 49ers beat the Rams=49ers);

Second, prior bets won by bettor by losing subject, such as losing team (e.g., 49ers beat the Rams=Rams);

Third, prior bets made, by subject (such as tea player) wagered upon by bettor (e.g., 49ers to beat the Redskins=49ers);

Fourth, prior bets made, by subject (such as team/player) wagered against by bettor 49ers to beat the Redskins=Redskins);

Fifth, the last bet(s) by proposition subject Altuve will hit a home run=Altuve);

Sixth, the last bet(s), by type (e.g., Pre-Game, In-game, proposition bet);

Seventh, bettor's favorite teams(s) (e.g., 49ers, Lakers, Dodgers, LA Kings);

Eighth, favorite team(s) by geographic area (such as region) (e.g., relative to the Philadelphia area, the Eagles, Phillies, Flyers, 76ers);

Ninth, the most common bets by people at the identified location of the bettor—current/proximate in time (e.g., most common bets that people at a bar or surrounding area have bet on in the last hour, such as the Philadelphia 76ers);

Tenth, the most common bets in the location—over time (e.g., people at the bar have historically bet on the Villanova Wildcats));

Eleventh, the most common bets by people at the location—historical (e.g. people at the bar or surrounding area have historically bet on the Philadelphia 76ers);

Twelfth, the game/event start time (already started by least time to end-of-game, today but not yet started, tomorrow, after tomorrow);

Thirteenth, game/event by league or category, sorted by ranking of betting handle (NFL, NCAAF, NBA, MLB, NHL, NCAAB).

In one embodiment, demonstrated betting behavior is ranked the highest, with the last x number bets (e.g., 3) being used before moving onto the other ranked bets in the algorithm. There is a cap based on the type of bet selected (for example, only 2 of each of the chosen bet type will be shown), which can be adjusted based on extraordinary behavior which can be defined by variation from normal behavior by a certain amount, like bets which are 2 standard deviations above normal will be shown in carousel in a higher priority).

If there is more than one bet that matches with a factor (e.g. multiple bets on the 49ers), then bets may be ranked on the total handle per bet (a/k/a, most popular bets).

Based on the available space on the display, there may be more bets displayed. This is based on the known resolution and screen space for the device. So, for a small device like a smartphone, 1-2 "Recommended Bets" are displayed. For a larger device, like a TV screen, 3-4 recommended bets are displayed.

Figure 5:
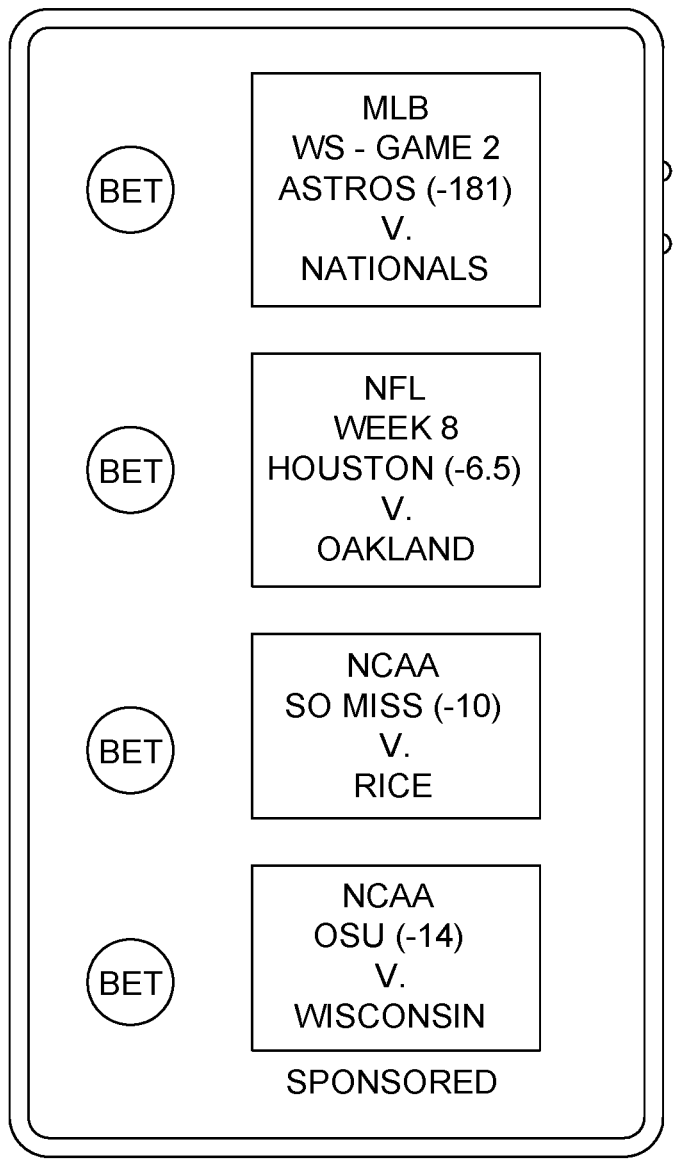
FIGS. 5 and 6 illustrate second examples of displays of information in accordance with the invention.
Figure 6:

FIGS. 5 and 6 illustrate additional examples of the invention. FIG. 5 illustrates the display of user-specific information in the form of offered bets as displayed on first display device, such as a user's tablet. FIG. 6 illustrates the display of user-specific information in the form of offered bets as displayed on a second display device, such as a user's phone.

In the example illustrated in FIG. 5, because the display of the user's display device is larger (than the display of the device in FIG. 6), more information can be displayed, such as information regarding four selected wagers. In this example, the user/bettor may have preferences which indicate that they live in Houston and that their favorite teams are the Houston Astros, Texans, Rockets and Dynamo. The preferences may also indicate that the bettor has recently placed wagers on the Astros in Game 1 of the World Series, and on Rice University football. In accordance with the algorithm above, the bettor is presented with wagers for Game 2 of the World Series (Astros v. Nationals) because of their preferences and recent wagering (and this wager is listed first because, in time, it is the next upcoming event in comparison to the other selected wagers that are displayed), plus a wager opportunity on the upcoming Texans game and the next Rice University game. In addition, the bettor may be presented with a fourth sponsored wagering opportunity. A sponsor might pay to have this wager weighted higher in the algorithm. For example, because this bettor places wagers on NCAA football, the higher weighting of this sponsor's bet for the OSU/Wisconsin NCAA game may then make the list of wagers to be displayed to the bettor.

Of course, other information might be displayed, including via secondary screens or the like. For example, if the player selects the "Houston v. Oakland" bet, they may be presented with a second screen that allows the bettor to select the amount to wager and whether they wish to wager on Houston or Oakland. Also, other types of bets may be displayed, as described above. For example, if the bettor had recently placed a proposition bet on the Astros v. Nationals game, the first wager presented to the bettor be a proposition bet (such as "Astros runs Game 2: Over/Under 3").

As illustrated in FIG. 6, because the user's display device is smaller, less information is selected and configured to be displayed. In this example, because the bettor's preferred teams include the Astros and the bettor bet on the last Astros game, the first displayed wager is on the next Astros game. In this example, the location of the bettor is determined to currently be the Park MGM in Las Vegas. The algorithm determines that other users/bettors in that area are currently betting on the upcoming Las Vegas Knights v. Avalanche NHL game that same clay. As a result, instead of other wagers such as those illustrated in FIG. 5, the algorithm determines that a wagering opportunity on the LV Knights game should be displayed to this better.

In one embodiment, the information, such as "Recommended Bets", may be displayed on a carousel or in a sequence, with y number of bets (e.g., 10) are displayed relative to a lesser number of positions, with the different bets rotating through those positions every z seconds (e.g., 5 seconds) to run through the most relevant bets for that bettor or group of bettors.

In one embodiment, as the following occur, the relative weight of all available bets may change, which then changes the carousel of "Recommended Bets" for the player: (1) Bets are resolved; (2) Time progresses; (3) Location changes; and (4) People in location change.

As noted herein, content which is displayed to a bettor may comprise one or more promotions, such as bet promotions. For example, in order to encourage a bettor to go to a venue, a time-based promotion may be utilized. Such a promotion might only be available for bettors located within or nearby to a venue (such as a brick-and-mortar vendor location like a sports bars, restaurant, arena, stadium, etc.). These promotions may be displayed to the user via their device or via venue displays. As one example, a promotion might provide that all winning bets placed by bettors who are at a Buffalo Wild Wings in the Philadelphia-area (as determined from the bettor's location) will pay 2× the normal winning payout. Such time-based, location-based promotions are helpful to the vendors, such as by being able to drive bets to one side of a wager that requires balance, helping offset the cost of the promotion. Vendors also may benefit from guests going to their brick-and-mortar locations looking for these promotions, which are not available at home.

In accordance with the invention, vendors such as sportsbooks operators are able to see betting behavior (by a single user or bettor and across all bettors or users or sub-groups thereof), including number of bettors, bet types, and data profiles. The vendors may be given suggested promotions which can be automatically or manually made "live" to bettors (either at their person device or in a venue). For example, a user could be at a sports bar where other bettors are making a significant number of in-game bets on the San Francisco 49ers. The vendor could automatically create a "flash promotion" for 2nd quarter bets on the San Francisco 49ers which expires after a certain time or number of bets are made. This offer can be available only to people that are geo-located at the sports bar, or available to anyone who has visited that sports bar in the past.

These suggest promotions can be individualized by user or generalized to a group of users. The group of users can be the people currently at the sport bar, or who have visited the sports bar during any period of time (and therefore available off site).

In a step S6, once the bettor information has been generated and then formatted, it is transmitted to the bettor's device(s) for display. As noted herein, such a device might comprise a personal device (such as a phone, laptop computer, tablet, TV or the like) or might comprise a public or quasi-public display device, such as a display at a bar or the like.

The method may include other or additional steps. For example, in a step S7, the bettor might provide various inputs. The inputs might comprise, for example, selecting particular displayed information to obtain more detailed information (for example, the information server 22 might cause the bettor's phone to simply display the names of players on their selected team and upon selecting one of those names, the information server 22 may cause their device to display a new window of information regarding that specific player). The bettor might also place bets via their device.

In one embodiment, as at step S8, the activities of the bettor may be monitored. Based upon those activities or actions, the bettor's preferences might be modified. As one example, a bettor might be presented with information regarding a plurality of NFL teams. For several weeks, the player might continually seek information regarding the Chiefs and the Rams. The player's preference file might be updated so that information regarding those two teams is prioritized (such as to provide information regarding those teams first or to provide more information regarding those teams as compared to other teams, or to provide information regarding wagers which are relevant to those teams vs. other teams, etc.).

While the invention has been described with reference to the generation and presentation of sports wagering related information, the invention may be applied to other types of information. For example, the system and method might be applied to entertainment events (for example, a viewer of the Oscars might desire information regarding particular actors or actresses, films or the like, information regarding past winners, etc., and the preferences of the viewer might be used to determine which information is displayed to the viewer and one which of the user's devices).

A particular advantage of the invention is that voluminous amounts of sports wagering related information (or as noted above, other types of information) are modified, such as by filtering and ordering the content based upon one or more bettor preferences, to provide sports wagering related information which is customized for a particular bettor. Also, that information is then customized based upon the bettor's devices to generate custom displays of the bettor-specific information. Importantly, the information may be displayed on two or more (such as three, four or more) display devices to the same user or bettor, wherein different of the bettor-specific information may be displayed on different ones of the displays.

Relative to a system of multiple users or bettors, the information which is display to each bettor may be entirely different, based upon each bettor's preferences and the one or more display devices which are used to display the information to each user. In accordance with the invention, information is customized to the bettor and their devices, eliminating the need for the bettor to sift through large quantities of information in an attempt to find sports wagering related information which is relevant to them.

Aspects of the invention may be used in other configurations, including in combination with other features or steps or without certain features or steps. As one example, in one embodiment of the invention information may be generated for display on multiple user devices where the information is not user specific (as used herein, the term "user specific information" generally means information which is selected or generated based upon stored, identified or generated preferences which are specific to that user). For example, a user might login to the system as a "guest", wherein the user has no stored personal preferences. In such a configuration, the system may simply generate information based upon the user's display devices (such as by determining the amount of the information to display and the format for that information).

In another embodiment, user-specific information might be generated for a user without an account or stored user preferences (or without using such information, even if it exists, such as if a member user logged into the system as a guest). For example, a guest user might be permitted to provide basic inputs of preferences when they seek to obtain information. As one example, a guest user might be presented with one or more options for information selection. As one example, a guest user might be permitted to select of first or primary information, such as: Pick ONE: NFL NBA NCAAFB NCAABB SOCCER NHL MLB. Once the user makes a selection of one of these primary selections, the user might be permitted to make at least one secondary selection. For example, having selected "NFL", the guest user might be presented with a menu of NFL teams and get instructed to select one or more teams. Based upon the one or more information selections, the system may generate a set of user specific information for that user (and then, preferably formats that information for display on the displays of the user based upon information regarding those displays and their configuration).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for configuring wager-related information for display to a user, comprising:
    a server comprising a processor, a memory, a communication interface and machine-readable code stored in said memory and executable by said processor;
    a database of user accounts, each of said user accounts having user-preference information associated therewith;
    said machine-readable code configured to:
        cause said processor to receive information regarding a location of a user and information regarding at least one user display device for displaying information to said user,
        to generate said user-specific information for said user from a set of information based upon said location and at least one of said user-preference information and group information, the user-specific information comprising one or more wager options selected based upon the following hierarchy of factors: (1) the winning subject of one or more prior wagers made by the user; (2) the losing subject of one or more prior wagers made by the user; (3) the subject wagered upon in one or more prior wagers made by the user; (4) the subject wagered against in one or more prior wagers made by the user; (5) the subject of one or more prior proposition wagers; (6) type of one or more prior wagers; (7) the favorite subjects of the user; (8) wagering subjects in a designated geographic area of the user; (9) the most common prior wagers by other users at the location of the user; (10) event start time; and (11) event sports league or category;
        to configure said user-specific information based upon a configuration of said at least one user display device which is to display said user-specific information comprising at least determining an amount and format for said user-specific information to be displayed by each of said plurality of user display devices based at least in part upon a size of a display of said user display device; and
        to transmit said user-specific information to said user display device to cause said user display device to display said user-specific information.

2. The system in accordance with claim 1, wherein said user-specific information comprises information regarding one or more sports wagers.

3. The system in accordance with claim 1, wherein said user-preference information comprises information regarding one or more wagers by said user.

4. The system in accordance with claim 1, wherein said at least one user display device comprises: a television, a monitor, a desktop computer, a laptop computer, a VR device, a phone, a PDA and a tablet.

5. The system in accordance with claim 1, wherein said user-preference information comprises information regarding one or more of: (1) favorite sport team(s) in one or more sports; (2) favorite player(s) in one or more sports; (3) favorite sport(s); (4) geographic area(s); (5) favorite sports league(s); (6) size of wager(s); (7) types of wager(s); and (8) event time(s)/time zones.

6. The system in accordance with claim 1, wherein said group information comprises information regarding wagers placed by other users at said location of said user.

7. The system in accordance with claim 1, wherein said at least one user display device comprises two user display devices and wherein said machine-readable code is configured to cause said processor to generate first user-specific information for a first one of said two user display devices based upon a configuration thereof and to generate second user-specific information for a second one of said two user display devices based upon a configuration thereof, whereby said two user display devices display different user-specific information.

8. The system in accordance with claim 1, further comprising an artificial intelligence (AI) engine, wherein said AI engine weights more heavily the user-specific information generated based upon said factors which comprising information regarding wagers which are determined to be likely to be placed by the user.

9. The system in accordance with claim 1, wherein said user-specific information is automatically displayed as the presentation of a repeating sequence of different sub-portions of said information by said at least one user display device to said user.

10. A system for configuring wager-related information for display to a user, comprising:
a server comprising a processor, a memory, a communication interface and machine-readable code stored in said memory and executable by said processor;
a database of user accounts, each of said user accounts having user-preference information associated therewith; and
said machine-readable code configured to cause said processor to receive information regarding a location of a user and information regarding at least one user display device for displaying information to said user, to generate user-specific wager-related information for a said user from a set of information based upon said location and at least one of said user-preference information and group information, said user-specific information comprising one or more wager options selected based upon the following hierarchy of factors: (1) the winning subject of one or more prior wagers made by the user; (2) the losing subject of one or more prior wagers made by the user; (3) the subject wagered upon in one or more prior wagers made by the user; (4) the subject wagered against in one or more prior wagers made by the user; (5) the subject of one or more prior proposition wagers; (6) type of one or more prior wagers; (7) the favorite subjects of the user; (8) wagering subjects in a designated geographic area of the user; (9) the most common prior wagers by other s s at the location of the user; (10) event start tame; and (11) event sports league or category, to configure said user-specific information based upon a configuration of said at least one user display device which is to display said user-specific information, and to transmit said user-specific information to said user display device to cause said user display device to display said user-specific information.

11. The system in accordance with claim 10, further comprising an artificial intelligence (AI) engine, wherein said AI engine weights more heavily the user-specific information generated based upon said factors which comprising information regarding wagers which are determined to be likely to be placed by the user.

12. The system in accordance with claim 10, wherein said user-specific information comprises information regarding one or more sports wagers.

13. The system in accordance with claim 10, wherein said user-preference information comprises information regarding one or more wagers by said user.

14. The system in accordance with claim 10, wherein said at least one user display device comprises: a television, a monitor, a desktop computer, a laptop computer, a VR device, a phone, a PDA and a tablet.

15. The system in accordance with claim 10, wherein said user-preference information comprises information regarding one or more of: (1) favorite sport team(s) in one or more sports; (2) favorite player(s) in one or more sports; (3) favorite sport(s); (4) geographic area(s); (5) favorite sports league(s); (6) size of wager(s); (7) types of wager(s); and (8) event time(s)/time zones.

16. The system in accordance with claim 10, wherein said group information comprises information regarding wagers placed by other users at said location of said user.

17. The system in accordance with claim 10, wherein said at least one user display device comprises two user display devices and wherein said machine-readable code is configured to cause said processor to generate first user-specific information for a first one of said two user display devices based upon a configuration thereof and to generate second user-specific information for a second one of said two user display devices based upon a configuration thereof, whereby said two user display devices display different user-specific information.

* * * * *

UNITED STATES PATENT AND TRADEMARK OFFICE
CERTIFICATE OF CORRECTION

PATENT NO.        : 11,188,201 B2
APPLICATION NO.   : 16/665308
DATED             : November 30, 2021
INVENTOR(S)       : Sameer Mohan Gupta et al.

It is certified that error appears in the above-identified patent and that said Letters Patent is hereby corrected as shown below:

In the Claims

In Claim 10 at Column 15, Line 37: "s s" should read --users--.

and

In Claim 10 at Column 15, Line 38: "tame" should read --time--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*